May 22, 1945. H. C. STEARNS 2,376,831
HIGH-PRESSURE VESSEL
Filed Oct. 7, 1942 2 Sheets-Sheet 1
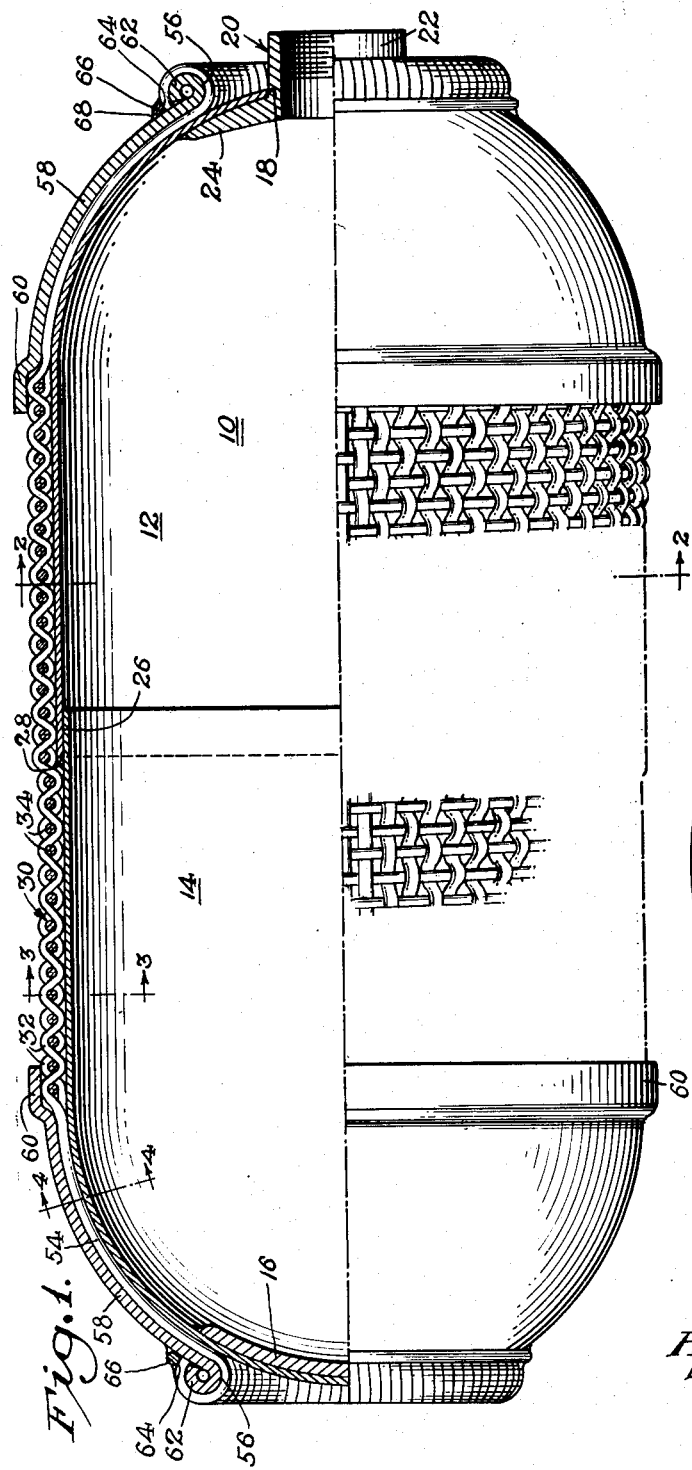
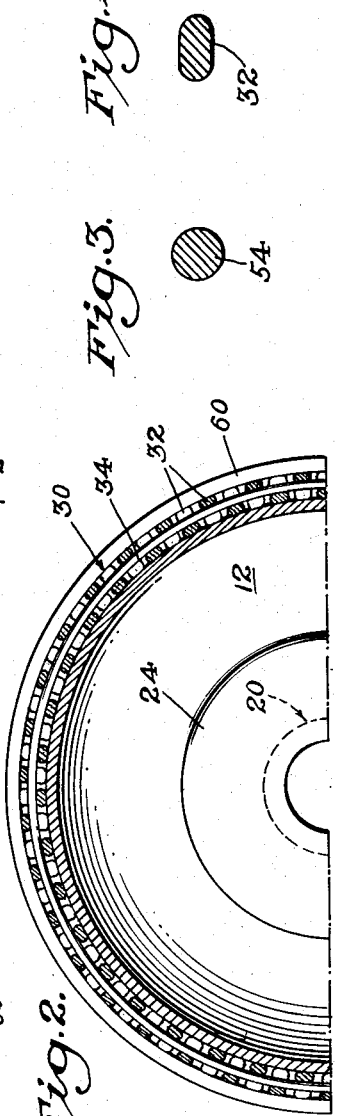
Inventor
Harry C. Stearns
BY
Attorney Inventor
Harry C. Stearns Patented May 22, 1945

UNITED STATES PATENT OFFICE 2,376,831

HIGH-PRESSURE VESSEL

Harry C. Stearns, Chicago, Ill., assignor to Products Development, Inc., Chicago, Ill., a corporation of Illinois Application October 7, 1942, Serial No. 461,152

5 Claims. (Cl. 220—3)

My invention relates to the construction of portable vessels for holding gases under high pressure.

Present day operations of military aircraft involve flights at altitudes so high that auxiliary oxygen must be supplied for breathing, and it is customarily obtained from small tanks or cylinders in which it is stored under high pressures. Compressed gases are also of value for other purposes in connection with the operation of aircraft.

Needless to say, the first requirement of tanks for aircraft use is light weight. The usual approach to the problem of getting sufficient strength with minimum weight in these tanks has been along conventional lines—the tank is formed in one piece from a steel billet by a hot forging process. But hot forging facilities and forge men capable of doing a good job are critically scarce, and even with the best of equipment and skill there is a high proportion of rejects, largely on account of the difficulty of accurately controlling the temperatures at which the forge operations are performed.

It is an object of my invention, therefore, to produce a gas cylinder of light weight, but with high mechanical strength as regards resistance to internal pressure.

Another object is the provision of a tank which will not shatter when struck by a bullet. This feature is an important one, since the tank or bottle, with its contents under high pressure may be more dangerous than the bullet itself if it shatters when hit.

With these and other objects in view, my invention consists in the construction and arrangement of the various elements of a high pressure vessel whereby the objects contemplated are attained, as hereinafter more fully set forth, pointed out in my claims and illustrated in the accompanying drawings, in which:

Figure 1 is a view of a pressure tank or bottle embodying the features of my invention, the upper half of the figure showing the structure in vertical section, and the lower half showing it in elevation;

Figure 2 is a transverse half section taken on the line 2—2 of Figure 1.

Figure 3 is a cross section of one of the longitudinal wires used in the construction of a reinforcing sheath, taken on the line 3—3 of Figure 1;

Figure 4 is a cross section of the wire taken on the line 4—4 of Figure 1;

Figure 5:
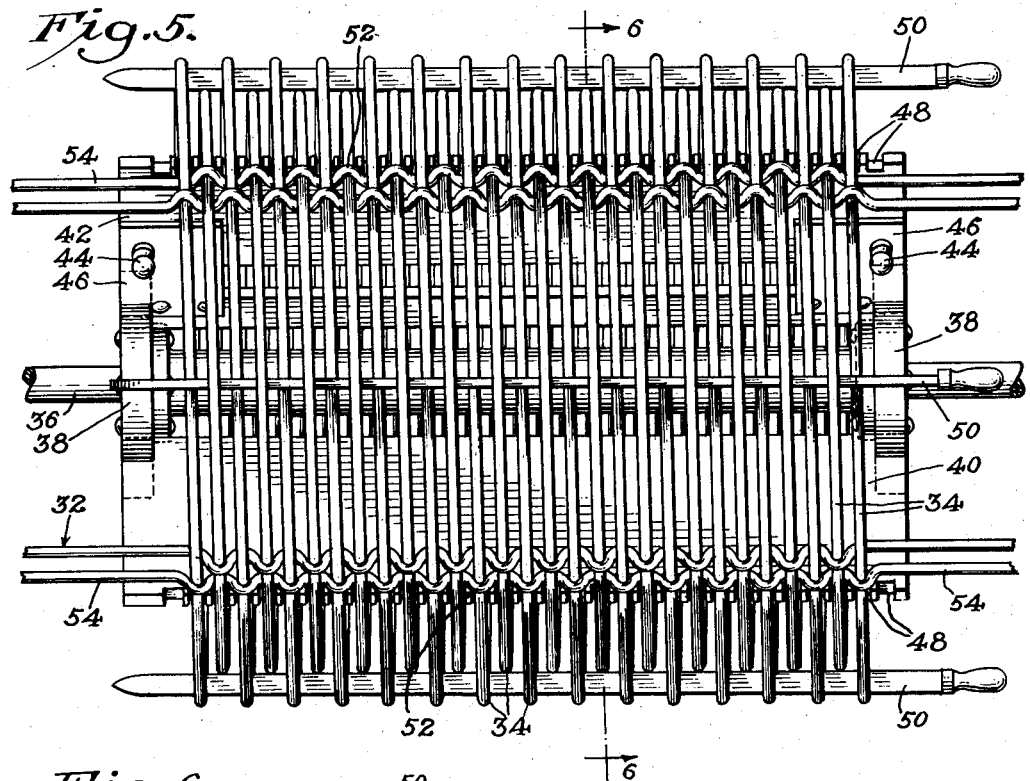
Figure 5 is an elevational view illustrating initial stages in the formation of the reinforcing sheath; and, Figure 6 is a vertical sectional view taken on the line 6—6 of Figure 5.

The drawings illustrate a practical form which my invention may assume, but are not intended as limitative of the scope of the invention.

The embodiment shown in the drawings has the general shape most suitable for vessels of this type—a cylinder with hemispherical ends. Broadly, my invention involves the provision of a relatively thin inner shell which serves as the impervious or gas-tight member, and an outer reinforcement consisting of a woven wire sheath around the cylindrical portion, and hemispherical end caps, the longitudinal wires of the woven sheath being continued on down under the end caps to suitable fastening means.

In the drawings I have used the reference numeral 10 to indicate generally the inner gas-tight shell. It consists preferably of two drawn steel semi-shells 12 and 14. A curved reinforcement plate 16 is brazed or otherwise fastened inside the hemispherical end of the shell 14. The shell 12 is provided with an opening 18 in its hemispherical end, and an outlet fitting 20 has a tubular neck 22 which extends out through the opening. The neck 22 is internally threaded to receive a control valve or other device for regulating the flow of gas from the vessel. The fitting 20 has an annular flange 24, curved to fit the inside of shell 12, and brazed to the shell. The flange is made wide enough so that it has adequate bearing upon the shell 12 and through it to the outer reinforcing members.

Each of the semi-shells 12 and 14 has a cylindrical portion and a hemispherical end, and the cylindrical portions are telescoped to form a joint 26 on a diameter midway of the length of the vessel. The joint is brazed as at 28.

About the cylindrical portion of the inner shell 10 I provide a reinforcing sheath 30, consisting of longitudinal wires 32, and a continuous, spirally wound circumferential wire 34.

A preferable material for this purpose is what is known in the trade as music wire, a high carbon steel wire which can be made to have tensile strength as high as 350,000 pounds per square inch, and which has a low percent elongation.

The woven sheath may be fabricated in any desired manner, though I have illustrated in the drawings one method which may be employed.

Figure 6:
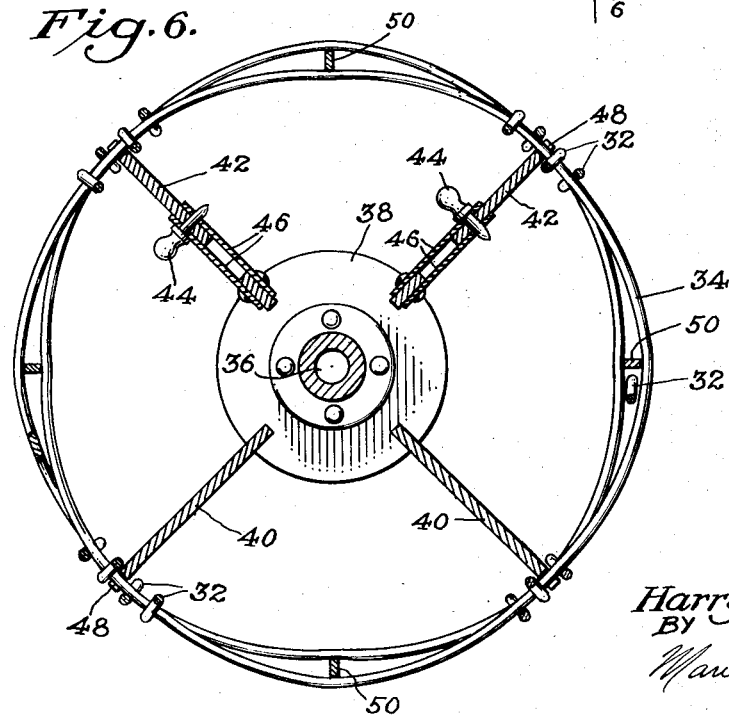

In Figures 5 and 6, the numeral 36 indicates a shaft carrying discs 38 which support axially extending plates 40, somewhat like the blades in a paddle wheel. Two more plates 42 are removably retained by pins 44 between pairs of mounting ears 46. The paddles so mounted constitute a form on which the circumferential wire 34 is wound, the edges of the paddles being provided with equally spaced notches 48 in which the wire is received. If a single wire 34 is used, an odd number of paddles is preferable; if two wires are wound simultaneously, the number of paddles may be odd or even.

Threading tools 50 are placed in the winding, being "woven" under and over adjacent turns of the wire 34. These tools are flattened in cross section, as may be seen in Figure 6. They can most easily be thrust through the winding with the flat sides parallel with the winding but after they have been inserted they are turned to the position shown in Figure 6, spreading the turns of the winding to make spaces into which the longitudinal wires 32 may be thrust.

The wires 32 are especially well shown in Figure 5, where it will be seen that the middle portion 52 of these wires is corrugated and somewhat flattened (see Figure 4) while the end sections 54 remain round and straight.

The longitudinal wires are inserted into the winding in the space next to the threading tool, as at the right in Figure 6. They are then moved circumferentially until they engage the helical winding firmly, as shown next to the paddles 40 and 42 in Figure 6. When several have been inserted in this way in each opening between the paddles, the pins 44 are withdrawn, allowing the paddle plates 42 to move inwardly, so that the partially woven structure may be taken off the form. The weaving is then continued with the same threading tool and the longitudinal wires are moved circumferentially as necessary to even up the spacing.

When the weaving is completed, the sheath 30 is slipped over the cylindrical portion of the shell 10, and the ends of the wires are drawn together to permit their passing through holes 56 in end caps 58. These caps are then pressed on, to the point where their enlarged portions 60 fit over the woven part of the sheath 30. The caps have a rolled edge 62 around the holes, forming an outwardly facing groove 64. The wires 32 are folded back around this edge and anchored in the groove by a tie wire 66. By brazing along the tie wire, as indicated at 68, the ends of the longitudinal wires are retained. Any extra length of wire can be nicked and broken off after the brazing.

The bottle is then ready for test, which involves placing it under high internal pressure. The inner semi-shell members 12 and 14, being deep drawn, are of metal having high percent elongation, so that under the influence of the high pressure they may expand circumferentially and longitudinally without rupture until the wire strands and end caps take the load. The pressure will reshape the music wire mesh to equalize the loads.

It is important to note that the corrugated form of the longitudinal wires 32 results in an interlocking or interanchoring of the weave in a manner which will withstand the load changes in any direction, without severe rupture, in case a bullet should sever individual strands. When an ordinary pressure vessel is punctured, the outrush of compressed gas tears the metal violently, often hurling fragments with great force. In my structure, however, the woven mesh of high-tensile wire is not subject to tearing, and largely confines the rupture to the immediate area punctured by a bullet. Gas may pass rather freely through the mesh, so that a leak in the inner shell as no tendency to cause rupture of the reinforcing sheath.

The tensile strength of music wire is so much greater than that of ordinary materials that it is possible to get the necessary mechanical strength with much less weight, and hence another of my principal objects is attained.

Some changes may be made in the form or arrangement of the parts of my structure without departing from the real spirit and purpose of my invention, and it is my intention to cover by my claims any modified forms of structure or use of mechanical equivalents which may reasonably be included within their scope.

I claim:

1. A pressure vessel consisting of a gas-tight shell having domed ends and a cylindrical intermediate portion, a reinforcing sheath including longitudinal wires having circumferential wires interwoven therewith along the cylindrical portion of said shell, and end caps fitting over the domed ends of said shell, said end caps having axial openings, and said longitudinal wires being drawn down over the ends of said shell, beneath said end caps and out through said openings, and being fastened to said end caps.

2. A container for holding gas under high pressure comprising a pair of cup-shaped shells telescoped and sealed together to form an elongated gas-tight bottle, a reinforcing sheath of interwoven circumferential and corrugated longitudinal wires surrounding the middle portion of said bottle, end caps fitting over the ends of said bottle, said end caps having axial openings with a rolled edge forming an outwardly facing groove, said longitudinal wires being drawn down over the ends of said bottle, beneath each end cap and around said rolled edge into said groove, and means retaining the ends of said longitudinal wires.

3. In a pressure vessel, a gas-tight shell having domed ends and a cylindrical intermediate portion, a woven mesh of circumferential and longitudinal wires surrounding the middle portion of said shell, end caps fitting over the domed ends of said shell and overlapping said mesh, said end caps having axial openings, and said longitudinal wires being drawn down over the ends of said shell beneath said end caps and out through said openings, means retaining the ends of said longitudinal wires, and a reinforcing plate inside said shell at one end thereof, so disposed as to cover and extend beyond the portion of said shell left unsupported by the opening in the corresponding end cap.

4. In a pressure vessel, an inner shell, reinforcing means therefor including a wire mesh surrounding the middle portion thereof, end caps fitting over the ends thereof, said end caps having axial openings, an outlet fitting at one end of said shell, extending out through the opening in the corresponding end cap, said fitting having a flange inside said shell, corresponding to the curvature thereof, and extending outward to the point where its bearing may be transmitted through the shell to the end cap, and a reinforcing plate inside said shell at the opposite end thereof, so disposed as to cover and extend beyond the portion of said shell left unsupported by the opening in the corresponding end cap.

5. A pressure vessel consisting of a gas-tight shell having domed ends and a cylindrical intermediate portion, a reinforced sheet including longitudinal wires having circumferential wires interwoven therewith along the cylindrical portion only of said shell, end caps fitting over the domed ends of said shell and substantially coextensive therewith, said end caps having openings, and said longitudinal wires being drawn down over the ends of said shell beneath said end caps and out through said openings, and being fastened to said end caps.

HARRY C. STEARNS.